(12) United States Patent
Iwahashi et al.

(10) Patent No.: US 7,429,546 B2
(45) Date of Patent: *Sep. 30, 2008

(54) SILICA GLASS CONTAINING $TiO_2$ AND PROCESS FOR ITS PRODUCTION

(75) Inventors: Yasutomi Iwahashi, Yokohama (JP); Akio Koike, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 131 days.

This patent is subject to a terminal disclaimer.

(21) Appl. No.: 11/172,950

(22) Filed: Jul. 5, 2005

(65) Prior Publication Data

US 2005/0272590 A1    Dec. 8, 2005

Related U.S. Application Data

(63) Continuation of application No. PCT/JP2004/004845, filed on Apr. 2, 2004.

(30) Foreign Application Priority Data

| Apr. 3, 2003 | (JP) | ............................. 2003-100496 |
| Sep. 12, 2003 | (JP) | ............................. 2003-321729 |
| Mar. 15, 2004 | (JP) | ............................. 2004-072762 |

(51) Int. Cl.
| C03C 3/06 | (2006.01) |
| C03C 3/076 | (2006.01) |
| C03C 3/11 | (2006.01) |
| C03C 3/112 | (2006.01) |
| C03B 19/06 | (2006.01) |
| C03B 37/018 | (2006.01) |

(52) U.S. Cl. .............................. 501/54; 501/53; 501/56; 501/57; 65/17.4; 65/391; 250/504 R; 359/350

(58) Field of Classification Search ................... 501/53, 501/54, 57, 56; 65/17.4, 391; 250/504 R; 359/350
See application file for complete search history.

(56) References Cited

U.S. PATENT DOCUMENTS

| 2,326,059 | A | * | 8/1943 | Nordberg ..................... 501/94 |
| 5,970,751 | A | * | 10/1999 | Maxon et al. ................. 65/414 |
| 6,465,272 | B1 | | 10/2002 | Davis et al. |
| 6,576,380 | B2 | | 6/2003 | Davis et al. |
| 2002/0157421 | A1 | * | 10/2002 | Ackerman et al. ........... 65/17.6 |
| 2004/0025542 | A1 | | 2/2004 | Ball et al. |
| 2005/0272590 | A1 | | 12/2005 | Iwahashi et al. |

FOREIGN PATENT DOCUMENTS

| EP | 0 582 070 | | 2/1994 |
| EP | 1 281 679 | | 2/2003 |
| EP | 1 281 680 | | 2/2003 |
| JP | 60176945 A | * | 9/1985 |
| WO | WO99/15468 A | * | 4/1999 |

OTHER PUBLICATIONS

U.S. Appl. No. 11/172,872, filed Jul. 5, 2005, Iwahashi et al.
U.S. Appl. No. 11/174,533, filed Jul. 6, 2005, Iwahashi et al.
U.S. Appl. No. 11/172,950, filed Jul. 5, 2002, Iwahashi et al.
U.S. Appl. No. 11/435,887, filed May 18, 2006, Iwahashi et al.
U.S. Appl. No. 11/589,875, filed Oct. 31, 2006, Koike et al.

* cited by examiner

*Primary Examiner*—Anthony J Green
(74) *Attorney, Agent, or Firm*—Oblon, Spivak, McClelland, Maier & Neustadt, P.C.

(57) ABSTRACT

A silica glass containing $TiO_2$, which has a fictive temperature of at most 1,200° C., a F concentration of at least 100 ppm and a coefficient of thermal expansion of 0±200 ppb/° C. from 0 to 100° C.

A process for producing a silica glass containing $TiO_2$, which comprises a step of forming a porous glass body on a target quartz glass particles obtained by flame hydrolysis of glass-forming materials, a step of obtaining a fluorine-containing porous glass body, a step of obtaining a fluorine-containing vitrified glass body, a step of obtaining a fluorine-containing formed glass body and a step of carrying out annealing treatment.

20 Claims, 2 Drawing Sheets

SILICA GLASS CONTAINING TIO₂ AND PROCESS FOR ITS PRODUCTION

TECHNICAL FIELD

The present invention relates to a silica glass containing $TiO_2$ (hereinafter referred to as $TiO_2$—$SiO_2$ glass) and a process for its production. Particularly, it relates to $TiO_2$—$SiO_2$ glass to be used for an optical material for an exposure device to be used for EUV lithography and a process for its production. In the present invention, EUV (Extreme Ultra Violet) light means light having a waveband in a soft X-ray region or in a vacuum ultraviolet region and specifically means light having a wavelength of from 0.2 to 100 nm.

BACKGROUND ART

Heretofore, in photolithography, it is common to employ an exposure device to transfer a fine circuit pattern onto a wafer to produce an integrated circuit. Along with high integration and high functionality of integrated circuits, microsizing of integrated circuits has been progressing, and an exposure device is required to form an image of a circuit pattern on a wafer with a high resolution in a deep focal depth, whereby blue shift of the exposure light source is in progress. The exposure light source has been advanced from the conventional g-line (wavelength: 436 nm), i-line (wavelength: 365 nm) or KrF excimer laser (wavelength: 248 nm), and now an ArF excimer laser (wavelength: 193 nm) is being used. Further, in order to be prepared for an integrated circuit for the next generation where the line width of a circuit pattern will be less than 100 nm, it is considered to be prospective to employ a $F_2$ laser (wavelength: 157 nm) as the exposure light source, but it is considered that even this can not cover beyond a generation of a line width of 70 nm.

Under these circumstances, a lithographic technique employing typically a light having a wavelength of 13 nm among EUV light (extreme ultraviolet light) as the exposure light source, has attracted attention, as it may be applied to the printing of feature of 50 nm or smaller. The image-forming principle of the EUV lithography (hereinafter referred to as "EUVL") is the same as the conventional photolithography to such an extent that a mask pattern is transferred by means of an optical projection system. However, in the energy region of EUV light, there is no material to let the light pass therethrough. Accordingly, a refraction optical system can not be used, and an optical system will be required to be a reflection optical system in all cases.

The optical material for the exposure device to be used for EUVL will be a photomask, a mirror or the like, and it is basically constituted of (1) a base material, (2) a reflective multilayer formed on the base material and (3) an absorber layer formed on the reflective multilayer. For the multilayer, it is studied to form layers of Mo/Si alternately, and for the absorber layer, it is studied to use Ta or Cr as the layer-forming material. As the base material, a material having a low thermal expansion coefficient is required so that no strain will be formed even under irradiation with EUV light, and a glass or the like having a low thermal expansion coefficient is being studied.

$TiO_2$—$SiO_2$ glass is known to be a very low thermal expansion material having a coefficient of thermal expansion (CTE) smaller than quartz glass, and the coefficient of thermal expansion can be controlled by the $TiO_2$ content in the glass, whereby it is possible to obtain a zero expansion glass having a coefficient of thermal expansion being close to zero. Accordingly, $TiO_2$—$SiO_2$ glass is prospective as a material to be used for an optical material for the exposure device for EUVL.

In a conventional method for preparing $TiO_2$—$SiO_2$ glass, firstly, a silica precursor and a titania precursor are, respectively, converted into a vapor form, and then mixed. Such a vapor form mixture is feeded into a burner and thermally decomposed to form $TiO_2$—$SiO_2$ glass particles. Such $TiO_2$—$SiO_2$ glass particles will be deposited in a refractory container and at the same time will be melted to form $TiO_2$—$SiO_2$ glass. However, in $TiO_2$—$SiO_2$ glass prepared by this method, the temperature region where the coefficient of thermal expansion becomes substantially zero, is limited to about room temperature.

Further, U.S. Patent application publication No. 2002/157421 discloses a method which comprises forming a $TiO_2$—$SiO_2$ porous glass body, converting it to a glass body, and then obtaining a mask substrate therefrom.

At the time of forming a reflective layer, the optical material for the exposure device for EUVL will have a temperature of about 100° C. Further, at the time of exposure, high energy rays will be irradiated, whereby the temperature of the material may locally increase.

Accordingly, the optical material for the exposure device for EUVL is desired to have a wide temperature region where the coefficient of thermal expansion becomes substantially zero. However, with conventional $TiO_2$—$SiO_2$ glass, the temperature region where the coefficient of thermal expansion becomes substantially zero, is narrow, and such is inadequate to be used for an optical material for the exposure device for EUVL.

DISCLOSURE OF THE INVENTION

Embodiment 1 of the present invention provides a silica glass containing $TiO_2$, which has a fictive temperature of at most 1,200° C., a F concentration of at least 100 ppm (based on mass, the same applies hereinafter) and a coefficient of thermal expansion of 0±200 ppb/° C. from 0 to 100° C.

Embodiment 2 provides a silica glass containing $TiO_2$, which has a fictive temperature of at most 1,200° C., a F concentration of at least 500 ppm and a coefficient of thermal expansion of 0±200 ppb/° C. from 0 to 100° C.

Embodiment 3 provides the silica glass containing $TiO_2$ according to Embodiment 1 or 2, which has a coefficient of thermal expansion of 0±150 ppb/° C. from 0 to 100° C.

Embodiment 4 provides the silica glass containing $TiO_2$ according to Embodiment 1, 2 or 3, which has a F concentration of at least 1,000 ppm.

Embodiment 5 provides the silica glass containing $TiO_2$ according to Embodiment 1, 2, 3 or 4, of which the fluctuation of the refractive index ($\Delta n$) is at most $2 \times 10^{-4}$ within an area of 30 mm×30 mm in at least one plane.

Embodiment 6 provides a process for producing a silica glass containing $TiO_2$, which comprises:

(a) a step of forming a porous glass body by depositing and growing on a target quartz glass particles obtained by flame hydrolysis of glass-forming materials;

(b) a step of holding the porous glass body in a fluorine-containing atmosphere to obtain a fluorine-containing porous glass body;

(c) a step of heating the fluorine-containing porous glass body to a vitrification temperature to obtain a fluorine-containing vitrified glass body;

(d) a step of heating the fluorine-containing vitrified glass body to a temperature above near the softening temperature and forming it in a desired shape to obtain a fluorine-containing formed glass body; and (e) a step of carrying out annealing treatment wherein the formed glass body is held at a temperature exceeding 500° C. for a predetermined time, and then, the temperature is lowered to 500° C. at an average cooling rate of at most 10° C./hr, or a step of carrying out annealing treatment wherein the formed glass body at a temperature of at least 1,200° C. is cooled to 500° C. at an average cooling rate of at most 10° C./hr.

Embodiment 7 provides a silica glass containing $TiO_2$, which comprises:

(a) a step of forming a porous glass body by depositing and growing on a target quartz glass particles obtained by flame hydrolysis of glass-forming materials;

(b) a step of holding the porous glass body in a fluorine-containing atmosphere to obtain a fluorine-containing porous glass body;

(c) a step of holding the fluorine-containing porous glass body in an atmosphere containing oxygen at from 300 to 1,300° C. for a predetermined time and then heating it to a vitrification temperature to obtain a fluorine-containing vitrified glass body;

(d) a step of heating the fluorine-containing vitrified glass body to a temperature above near the softening temperature and forming it in a desired shape to obtain a fluorine-containing formed glass body; and (e) a step of carrying out annealing treatment wherein the formed glass body is held at a temperature exceeding 500° C. for a predetermined time, and then, the temperature is lowered to 500° C. at an average cooling rate of at most 10° C./hr, or a step of carrying out annealing treatment wherein the formed glass body at a temperature of at least 1,200° C. is cooled to 500° C. at an average cooling rate of at most 10° C./hr.

According to the present invention, it is possible to obtain a fluorine-containing $TiO_2$—$SiO_2$ glass having a small change in the coefficient of thermal expansion by temperature i.e. a wide temperature range where the coefficient of thermal expansion becomes to be substantially zero and being excellent in the uniformity of the mechanical characteristics and the coefficient of the thermal expansion in glass. Accordingly, it is very useful as a material for a component constituting an optical system to be used for EUVL.

Figure 1:
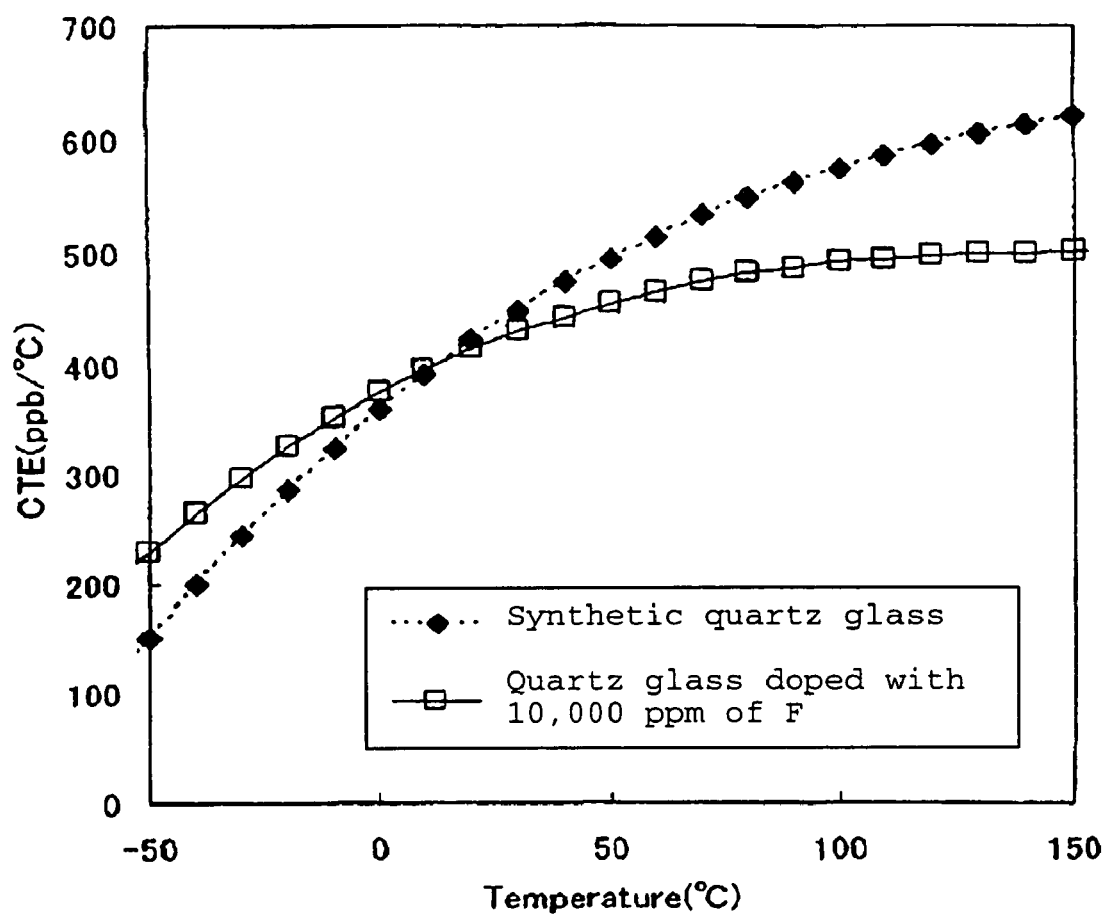
FIG. 1 is a graph showing the change by temperature of the coefficient of thermal expansion of a synthetic quartz glass containing no F and that of a synthetic quartz glass containing 10,000 ppm of F.

BEST MODE FOR CARRYING OUT THE INVENTION $TiO_2$—$SiO_2$ glass is known to have a coefficient of thermal expansion which changes depending upon the concentration of $TiO_2$ contained, and the coefficient of thermal expansion of $TiO_2$—$SiO_2$ glass containing about 7 mass % of $TiO_2$ becomes substantially zero at near room temperature.

The $TiO_2$—$SiO_2$ glass of the present invention is preferably a silica glass containing from 1 to 12 mass % of $TiO_2$. If the content of $TiO_2$ is less than 1%, zero expansion may not be accomplished, and if it exceeds 12 mass %, the coefficient of thermal expansion is likely to be negative. The content of $TiO_2$ is more preferably from 5 to 9 mass %.

In the present invention, the fictive temperature is at most 1,200° C., preferably at most 1,100° C., particularly preferably at most 1,000° C.

The present inventors have found that the fictive temperature and the extent of the temperature range for zero expansion are related. Namely, if the fictive temperature exceeds 1,200° C., the temperature range for zero expansion tends to be narrow, and such a material tends to be inadequate as a material to be used for an optical material for the exposure device for EUVL. In this specification, the temperature range within which the coefficient of thermal expansion of glass becomes substantially zero, is referred to also as the temperature range for zero expansion. To broaden the temperature range for zero expansion, the fictive temperature is preferably at most 950° C., more preferably at most 900° C.

In order to obtain such a fictive temperature in the present invention, a method is, for example, effective wherein the glass material is held at a temperature of from 600 to 1,200° C., for at least 5 hours and then the temperature is lowered to 500° C. at an average cooling rate of at most 10° C./hr. Accordingly, a $TiO_2$—$SiO_2$ glass body was held at 900° C. for 100 hours, then cooled to 500° C. at a rate of 10° C./hr and then cooled in air, whereby the fictive temperature of the $TiO_2$—$SiO_2$ glass body became 860° C.

The fictive temperature is measured as follows. With respect to polished $TiO_2$—$SiO_2$ glass, the absorption spectrum is taken by measured of an infrared spectrometer (Magna 760, manufactured by Nikolet Company). At that time, the data taking interval is set to be about 0.5 $cm^{-1}$, and for the absorption spectrum, an average value obtained by scanning 64 times, is employed. In the infrared absorption spectrum thus obtained, the peak observed at about 2,260 $cm^{-1}$ is attributable to an overtone of stretching vibration by the Si—O—Si bond of $TiO_2$—$SiO_2$ glass. The fictive temperature is obtained from this peak position by using a calibration curve which is prepared by glass having the same composition having a known fictive temperature. Otherwise, the reflection spectrum of the surface is measured in a similar manner by means of a similar infrared spectrometer. In the infrared reflection spectrum obtained in such a manner, the peak observed at about 1,120 $cm^{-1}$ is attributable to the stretching vibration by the Si—O—Si bond of $TiO_2$—$SiO_2$ glass. The fictive temperature is obtained from this peak position by using a calibration curve which is prepared by glass of the same composition having a known fictive temperature.

In the present invention, F is at least 100 ppm, preferably at least 200 ppm. In order to further lower the fictive temperature and broaden the zero expansion range, F is preferably at least 500 ppm, more preferably at least 1,000 ppm, particularly preferably at least 2,000 ppm, most preferably at least 5,000 ppm.

It is known long before that the F concentration is influential over the structural relaxation of glass (Journal of Applied Physics 91(8), 4886 (2002)). According to this report, the structural relaxation time is accelerated by F, whereby it tends to be easy to realize a glass structure having a low fictive temperature (first effect). Thus, F-doping to $TiO_2$—$SiO_2$ glass is effective to lower the fictive temperature and to broaden the temperature range for zero expansion.

However, F-doping is considered to have a larger effect to broaden the temperature range for zero expansion than to lower the fictive temperature (second effect).

The present inventors have investigated the influence of the F concentration over the temperature dependence of the coefficient of thermal expansion. By comparing synthetic quartz glass containing F and not containing F, which have an equal fictive temperature, it was made clear that the change by temperature of the coefficient of thermal expansion with the glass containing F, tends to be small within a temperature range of from −50 to 150° C.

Specifically, as shown in FIG. 1, within a temperature range of from −50 to 150° C., the coefficient of thermal expansion of synthetic quartz glass varies within a range of from 150 to 630 ppb/° C., while with synthetic quartz glass containing 10,000 ppm of F, the coefficient of thermal expansion varies only within a range of from 230 to 500 ppb/° C., and the change by temperature of the coefficient of thermal expansion becomes small.

From such a viewpoint that with respect to glass, an additivity relationship can be applied between the composition and the physical properties, it is considered that the second effect of F-doping, can be applied not only with synthetic quartz glass but also with $TiO_2$—$SiO_2$ glass. This means that with $TiO_2$—$SiO_2$ glass having a coefficient of thermal expansion close to zero, by F-doping, the change by temperature of the coefficient of thermal expansion will be small within a temperature range of from −50 to 150° C., and the temperature range showing zero expansion will be broadened.

Further, with $TiO_2$—$SiO_2$ glass having a coefficient of thermal expansion close to zero, by F-doping, the temperature range in which the coefficient of thermal expansion becomes 0±5 ppb/° C., is considered to be likewise broadened. For a material to be used as an optical material for the exposure device for EUVL, the temperature width wherein the coefficient of thermal expansion becomes 0±5 ppb/° C. is preferably at least 4.5° C., more preferably at least 5.0° C., particularly preferably at least 6.0° C.

Further, doping of a halogen except for F is also considered to be effective like F to reduce the change by temperature of the coefficient of thermal expansion within the temperature range of from −50 to 150° C. and to broaden the temperature range showing zero expansion, with respect to $TiO_2$—$SiO_2$ glass.

The following several processes are available as processes for producing $TiO_2$—$SiO_2$ glass containing F. One of them is a process which comprises depositing and growing $TiO_2$—$SiO_2$ glass particles (soot) obtained by flame hydrolysis or thermal decomposition of a Si precursor and a Ti precursor as glass-forming materials, that is a soot process, to obtain a porous $TiO_2$—$SiO_2$ glass body, treating the obtained porous $TiO_2$—$SiO_2$ glass body in a F-containing atmosphere, followed by heating to a temperature of at least a vitrification temperature to obtain a F-containing $TiO_2$—$SiO_2$ glass body. As such a soot process, a MCVD process, an OVD process and a VAD process are, for example, available depending upon the manner of preparation of the soot.

In this specification, the vitrification temperature is a temperature at which a porous glass body can be densified until no more void can be detected by an optical microscope.

As a soot process, there is a process for producing a F-containing $TiO_2$—$SiO_2$ glass body, by using compounds containing F as the Si precursor and the Ti precursor as the glass-forming materials, or by feeding the Si precursor and the Ti precursor to flame hydrolysis or thermal decomposition in a F-containing atmosphere to obtain a F-containing porous $TiO_2$—$SiO_2$ glass body.

Further, there is a process for producing a F-containing $TiO_2$—$SiO_2$ glass body, wherein by a direct method, compounds containing F are used as the Si precursor and the Ti precursor as the glass-forming materials, or the Si precursor and the Ti precursor are hydrolyzed and oxidized in an oxyhydrogen flame of from 1,800 to 2,000° C. in a F-containing atmosphere.

The method for measuring the F concentration is as follows. The $TiO_2$—$SiO_2$ glass is heated and fused by anhydrous sodium carbonate, and to the obtained fused liquid, distilled water and hydrochloric acid are added each in a volume ratio of 1 to the fused liquid, to obtain a sample liquid. The electromotive force of the sample liquid is measured by a radiometer by using a fluorine ion selective electrode and, as a comparative electrode, No. 945-220 and No. 945-468 manufactured by Radiometer Trading Company, respectively, and the fluorine content is obtained based on a calibration curve preliminarily prepared by using a fluorine ion standard solution (Journal of Japanese Chemical Society, 1972 (2), 350). Here, the detection limit by this method is 10 ppm.

According to the present invention, $TiO_2$—$SiO_2$ glass can be made to be a zero expansion glass wherein the coefficient of the thermal expansion is within a range of 0±150 ppb/° C., within a wide temperature range of from 0 to 100° C. Further, in a case where the fictive temperature of the $TiO_2$—$SiO_2$ glass is at most 1,100° C., the temperature range showing a coefficient of thermal expansion of substantially zero will be broader, and the coefficient of thermal expansion can be made within a range of 0±200 ppb/° C. within a range of from −50 to 150° C.

The coefficient of thermal expansion is measured within a range of from −150 to +200° C. by using a laser interferometer type thermal expansion meter (LIX-1, manufactured by ULVAC-RIKO, Inc.).

In this specification, "fluctuation of the fictive temperature" is defined as the difference between the maximum value and the minimum value of the fictive temperature within 30 mm×30 mm in at least one plane. The fluctuation of the fictive temperature is preferably within 100° C., particularly preferably within 70° C. If the fluctuation of the fictive temperature exceeds the above range, the coefficient of thermal expansion may have a difference depending upon the position.

The fluctuation of the fictive temperature can be measured as follows. A $TiO_2$—$SiO_2$ glass body formed to have a prescribed size, is sliced to obtain a $TiO_2$—$SiO_2$ glass block of 50 mm×50 mm×10 mm. With respect to an area of 50 mm×50 mm of this $TiO_2$—$SiO_2$ glass block, the fictive temperature is measured in accordance with the above-mentioned method with an interval of 10 mm pitch, whereby the fluctuation of the fictive temperature of the formed $TiO_2$—$SiO_2$ glass body is obtained.

When $TiO_2$—$SiO_2$ glass is used as an optical material for the exposure device for EUVL, it is very important to make the $TiO_2/SiO_2$ ratio in the glass to be uniform with a view to minimizing a fluctuation of the coefficient of thermal expansion within the material. A fluctuation of this $TiO_2/SiO_2$ ratio is influential over the refractive index of glass, and as an index for the uniformity of the $TiO_2$—$SiO_2$ composition, the fluctuation of the refractive index ($\Delta n$) may be used. Further, a fluctuation of the refractive index in micro-regions usually observed like stripes i.e. so-called striae, is likewise attributable to the fluctuation of the $TiO_2/SiO_2$ ratio and is likely to form rough texture after polishing. In the present invention, $\Delta n$ is defined to be the difference between the maximum value and the minimum value of the refractive index within 30 mm×30 mm in at least one plane. From the above-mentioned viewpoint, $\Delta n$ is preferably within $2 \times 10^{-4}$, particularly preferably within $1.5\times10^{-4}$. If Δn exceeds the above range, the fluctuation of the coefficient of thermal expansion is likely to be large. To obtain such Δn, it is effective to use the soot process.

Δn is measured as follows. From a $TiO_2$—$SiO_2$ glass body formed into a cube of 40 mm×40 mm×40 mm, each side of the cube is sliced in a thickness of 1 mm to obtain a plate-shaped $TiO_2$—$SiO_2$ glass block of 38 mm×38 mm×1 mm. By a Fizeau interferometer, a helium neon laser beam is vertically irradiated to an area of 38 mm×38 mm of this glass block, whereby the distribution of the refractive index is measured.

With the $TiO_2$—$SiO_2$ glass obtainable by the present invention, when the fluctuation of the fictive temperature is within 100° C., the fluctuation of the OH group concentration is within 50 ppm and Δn is within $2\times10^{-4}$, the distribution of the coefficient of the thermal expansion can be made to be within 30 ppb/° C. within 30 mm×30 mm in at least one plane, and such is suitable as an optical material for the exposure device for EUVL.

The OH group concentration is measured as follows. The measurement is carried out by means of an infrared spectrophotometer, and from the absorption peak at a wavelength of 2.7 μm, the OH group concentration is obtained (J. P. Williams et. Al., American Ceramic Society Bulletin, 55(5), 524, 1976). The detection limit by this method is 0.1 ppm.

The distribution of the coefficient of thermal expansion is measured as follows. A $TiO_2$—$SiO_2$ glass body formed to have a prescribed size is cut into small pieces of $TiO_2$—$SiO_2$ glass of 15 mm×15 mm×1 mm. The coefficient of thermal expansion of each of such small pieces is measured in accordance with the above-described method to obtain the fluctuation of the coefficient of thermal expansion of the formed $TiO_2$—$SiO_2$ glass block.

The following process can be employed for producing the $TiO_2$—$SiO_2$ glass of the present invention.

Step (a)

$TiO_2$—$SiO_2$ glass particles obtained by flame hydrolysis of a Si precursor and a Ti precursor as glass-forming materials, are deposited and grown on a target to form a porous $TiO_2$—$SiO_2$ glass body. The glass-forming materials are not particularly limited so long as they are materials capable of being gasified. However, the Si precursor may, for example, be a silicon halide compound, such as a chloride such as $SiCl_4$, $SiHCl_3$, $SiH_2Cl_2$ or $SiH_3Cl$, a fluoride such as $SiF_4$, $SiHF_3$ or $SiH_2F_2$, a bromide such as $SiBr_4$ or $SiHBr_3$ or an iodide such as $SiI_4$, or an alkoxy silane represented by $R_nSi(OR)_{4-n}$ (wherein R is a $C_{1-4}$ alkyl group, and n is an integer of from 0 to 3), and the Ti precursor may, for example, be a titanium halide compound such as $TiCl_4$ or $TiBr_4$, or a titanium alkoxide represented by $R_nSi(OR)_{4-n}$ (wherein R is a $C_{1-4}$ alkyl group, and n is an integer of from 0 to 3). Further, as the Si precursor and the Ti precursor, a compound of Si and Ti, such as a silicon-titanium alkoxide, may also be used.

As the target, a quartz glass target (such as a target as disclosed in JP-B-63-24973) may be used. It may not be limited to a rod shape, and a plate-shaped target may be employed.

Step (b)

The porous $TiO_2$—$SiO_2$ glass body obtained in step (a) is held in a fluorine-containing atmosphere to obtain a fluorine-containing porous $TiO_2$—$SiO_2$ glass body. As such a fluorine-containing atmosphere, an inert gas atmosphere containing from 0.1 to 100 volume % of a fluorine-containing gas (such as $SiF_4$, $SF_6$, $CHF_3$, $CF_4$, $C_2F_6$, $C_3F_8$ or $F_2$) is preferred. In such an atmosphere, it is preferred to carry out treatment under a pressure of from 10,000 to 100,000 Pa (about 1 atm) for from a few tens minutes to a few hours at room temperature or at a high temperature of at most the vitrification temperature, which will be described hereinafter. In a case where it is desired to lower the treating temperature and yet to have the same amount of fluorine doped, the treating time may be extended so that the glass body is held for from 5 hours to a few tens hours.

If a temperature higher than the vitrification temperature is employed, densification of the porous $TiO_2$—$SiO_2$ glass body will proceed, whereby it tends to be difficult to have fluorine doped to the interior of the porous $TiO_2$—$SiO_2$ glass body, such being undesirable.

For example, in a case where $SiF_4$ is employed as the fluorine-containing atmosphere, the treating temperature and the treating time may be set as follows depending upon the amount of fluorine to be doped to the porous $TiO_2$—$SiO_2$ glass body.

In a case where it is desired to control the amount of fluorine doped to a level of less than 1,000 ppm, the glass body may be held in an inert gas atmosphere containing from 1 to 10 vol % of $SiF_4$ at room temperature for from two hours to a few tens hours. In a case where it is desired to adjust the amount of fluorine doped to a level of from 1,000 to 5,000 ppm, it may be held in an inert gas atmosphere containing from 2 to 10 vol % of $SiF_4$ at from 500 to 1,000° C. for from two hours to a few tens hours. In a case where it is desired to adjust the amount of fluorine doped to a level of from 5,000 ppm to 10,000 ppm, it may be held in an inert gas atmosphere containing from 5 to a few tens vol % of $SiF_4$ at from 1,000 to 1,300° C. for from two hours to a few tens hours.

In this specification, "Pa" is not a gauge pressure but an absolute pressure.

It has been pointed out that in a case where fluorine is to be doped to a synthetic quartz glass synthesized by a soot process in a conventional manner, if fluorine is doped at a high temperature, oxygen deficient centers are likely to form, thus causing a decrease in the light transmittance. However, a decrease in the light transmittance is not problematic in a case where the glass is used for an optical component to be used in a reflection optical system. Accordingly, it becomes possible to incorporate a very large amount of fluorine by treatment at a high temperature of at most the vitrification temperature, and the amount of fluorine doped can be made to be at least a few thousands ppm at the maximum.

Further, in step (b), fluorine can be doped to the porous $TiO_2$—$SiO_2$ glass body uniformly in a short time. Accordingly, it is preferred that the porous $TiO_2$—$SiO_2$ glass body is held under a reduced pressure (preferably at most 13,000 Pa, particularly preferably at most 1,300 Pa) and then a fluorine-containing gas is introduced to a normal pressure to form a fluorine-containing atmosphere.

Step (c)

The fluorine-containing porous $TiO_2$—$SiO_2$ glass body obtained in step (b) is held in an oxygen-containing atmosphere to an extent not to let the glass body densify at from 300 to 1,300° C. for from 5 hours to a few tens hours. This is to prevent coloration of glass in the subsequent heat treatment. Oxygen in the atmosphere is preferably from 1 to 100%, and in order to more certainly prevent coloration of glass, oxygen is more preferably from 20 to 100%.

Then, the oxygen-treated porous $TiO_2$—$SiO_2$ glass body is heated to the vitrification temperature to obtain a fluorine-containing vitrified $TiO_2$—$SiO_2$ glass body. The vitrification temperature is usually from 1,250 to 1,700° C., preferably from 1,300 to 1,650° C. In a case where the fluorine content is large, the viscosity of glass tends to be low, and the vitrification temperature tends to be low, and accordingly, it is preferably from 1,250 to 1,550° C., particularly preferably from 1,300 to 1,500° C.

The atmosphere is preferably an atmosphere of 100% inert gas such as helium or an atmosphere containing an inert gas such as helium, as the main component. The pressure may be a reduced pressure or a normal pressure. Especially in the case of a normal pressure, helium gas may be employed. In the case of a reduced pressure, a pressure of at most 13,000 Pa is preferred.

Step (d)

The fluorine-containing vitrified $TiO_2$—$SiO_2$ glass body obtained in step (c) is heated to a temperature above near the softening temperature and formed into a desired shape to obtain a fluorine-containing formed $TiO_2$—$SiO_2$ glass body. The temperature for forming is preferably from 1,500 to 1,800° C. If it is lower than 1,500° C., no substantial dead-weight transformation takes place, since the viscosity of the fluorine-containing $TiO_2$—$SiO_2$ glass is high, and growth of cristobalite being a crystalline phase of $SiO_2$ or growth of rutile or anatase being a crystalline phase of $TiO_2$ takes place, thus leading to so-called devitrification. If the temperature exceeds 1,800° C., vaporization of $SiO_2$ tends to be not negligible.

Step (e)

The fictive temperature of the $TiO_2$—$SiO_2$ glass is controlled by carrying out annealing treatment wherein the formed $TiO_2$—$SiO_2$ glass body obtained in step (d) is held at a temperature of from 600 to 1,200° C., for at least 5 hours, and then, the temperature is lowered to not higher than 500° C. at an average cooling rate of at most 10° C./hr. Otherwise, the fictive temperature of the $TiO_2$—$SiO_2$ glass is controlled by carrying out annealing treatment wherein the formed $TiO_2$—$SiO_2$ glass body obtained in step (d) at a temperature of at least 1,200° C. is cooled to 500° C. at an average cooling rate of at most 10° C./hr. After the temperature is lowered to not higher than 500° C., the glass body may be cooled. The atmosphere in such a case is preferably an atmosphere of 100% inert gas such as helium, argon or nitrogen or an atmosphere containing such an inert gas as the main component, or an atmosphere of air, and the pressure is preferably a reduced pressure or a normal pressure.

Now, the present invention will be described in further detail with reference to Examples. However, it should be understood that the present invention is by no means restricted to such specific Examples. In Examples, the sizes of samples used for measurement are small, for example, at a level of 20 mm×20 mm with a thickness of 2 mm, whereby even if the samples are quenched at the time of annealing treatment in step (e), no substantial temperature distribution will be caused in the samples. Therefore, for the annealing treatment, a quenching method is adopted without adopting a method of lowering the temperature at an average cooling rate of at most 10° C./hr to 500° C. Further, by such quenching, it is possible to prepare samples having high fictive temperatures.

EXAMPLE 1

$TiO_2$—$SiO_2$ glass particles obtained by gasifying $TiCl_4$ and $SiCl_4$ as glass-forming materials for $TiO_2$—$SiO_2$ glass, respectively, then mixing them and feeding them to heat hydrolysis (flame hydrolysis) in oxyhydrogen flame, were deposited and grown on a target to form a porous $TiO_2$—$SiO_2$ glass body having a diameter of about 80 mm and a length of about 100 mm (step (a)).

The obtained porous $TiO_2$—$SiO_2$ glass body was difficult to handle as it was, and as deposited on the target, it was maintained at 1,200° C. for 4 hours in atmospheric air and then removed from the target.

Thereafter, the porous $TiO_2$—$SiO_2$ glass body was set in an electric furnace capable of controlling the atmosphere, and after reducing the pressure to 10 Torr at room temperature, while introducing a gas mixture of $He/SiF_4=90/10$ (volume ratio), it was maintained in this atmosphere at 1,000° C. under a normal pressure for 4 hours to carry out fluorine doping (step (b)).

Thereafter, it was maintained in an atmosphere of 100% $O_2$ under normal pressure for 30 hours and then heated to 1,570° C. in an atmosphere of 100% He and then held at this temperature for 4 hours to obtain a fluorine-containing vitrified $TiO_2$—$SiO_2$ glass body (step (c)).

The obtained fluorine-containing vitrified $TiO_2$—$SiO_2$ glass body was heated to 1,600° C. and formed to have a block shape, to obtain a fluorine-containing formed $TiO_2$—$SiO_2$ glass body (step (d)).

The obtained glass was held at 900° C. for 100 hours and then quenched to control the fictive temperature (step (e)).

EXAMPLE 2

$TiO_2$—$SiO_2$ glass particles obtained by gasifying $TiCl_4$ and $SiCl_4$ as glass-forming materials for $TiO_2$—$SiO_2$ glass, respectively, then mixing them and feeding them to heat hydrolysis (flame hydrolysis) in oxyhydrogen flame, were deposited and grown on a target to form a porous $TiO_2$—$SiO_2$ glass body having a diameter of about 80 mm and a length of about 100 mm (step (a)).

The obtained porous $TiO_2$—$SiO_2$ glass body was difficult to handle as it was, and as deposited on the target, it was maintained at 1,200° C. for 4 hours in atmospheric air and then removed from the target.

Thereafter, the porous $TiO_2$—$SiO_2$ glass body was set in a chamber capable of controlling the atmosphere, and after reducing the pressure to 10 Torr at room temperature, a gas mixture of $O_2/SiF_4=90/10$ (volume ratio) was introduced, and the glass body was held at room temperature under normal pressure for 24 hours to carry out fluorine doping (step (b)).

Thereafter, the F-containing porous $TiO_2$—$SiO_2$ glass body was set in an electric furnace capable of controlling the atmosphere, heated to 1,000° C. in an atmosphere of 100% $O_2$ and held under normal pressure for 30 hours. Then, the temperature was raised to 1,570° C. in an atmosphere of 100% He, and then held at this temperature for 4 hours to obtain a fluorine-containing vitrified $TiO_2$—$SiO_2$ glass body (step (c)).

The obtained fluorine-containing vitrified $TiO_2$—$SiO_2$ glass body was heated to 1,650° C. and formed into a block shape, thereby to obtain a fluorine-containing formed $TiO_2$—$SiO_2$ glass body (step (d)).

The obtained glass was held at 900° C. for 100 hours and then quenched to control the fictive temperature (step (e)).

EXAMPLE 3

ULE#7972 manufactured by Corning Inc., known as zero expansion $TiO_2$—$SiO_2$ glass, was held at 900° C. for 100 hours and then quenched to control the fictive temperature (step (e)).

EXAMPLE 4

TiO$_2$—SiO$_2$ glass particles obtained by gasifying TiCl$_4$ and SiCl$_4$ as glass-forming materials for TiO$_2$—SiO$_2$ glass, respectively, then mixing them and feeding them to heat hydrolysis (flame hydrolysis) in oxyhydrogen flame, were deposited and grown on a target to form a porous TiO$_2$—SiO$_2$ glass body having a diameter of about 80 mm and a length of about 100 mm (step (a)).

The obtained porous TiO$_2$—SiO$_2$ glass body was difficult to handle as it was, and as deposited on the target, it was maintained at 1,200° C. for 4 hours in atmospheric air and then removed from the target.

The obtained porous TiO$_2$—SiO$_2$ glass body was set in an electric furnace capable of controlling the atmosphere, and after reducing the pressure to 10 Torr at room temperature, it was heated to 1,570° C. in an atmosphere of 100% He and held at this temperature for 4 hours to obtain a vitrified TiO$_2$—SiO$_2$ glass body (step (c)).

The obtained vitrified TiO$_2$—SiO$_2$ glass body was heated to 1,650° C. and formed into a block shape to obtain a formed TiO$_2$—SiO$_2$ glass body (step (d)).

The obtained glass was held at 1,150° C. for 10 hours and then quenched to control the fictive temperature (step (e)).

EXAMPLE 5

TiO$_2$—SiO$_2$ glass particles obtained by gasifying TiCl$_4$ and SiCl$_4$ as glass-forming materials for TiO$_2$—SiO$_2$ glass, respectively, then mixing them and feeding them to heat hydrolysis (flame hydrolysis) in oxyhydrogen flame, were deposited and grown on a target to form a porous TiO$_2$—SiO$_2$ glass body having a diameter of about 80 mm and a length of about 100 mm (step (a)).

The obtained porous TiO$_2$—SiO$_2$ glass body was difficult to handle as it was, and as deposited on the target, it was maintained at 1,200° C. for 4 hours in atmospheric air and then removed from the target.

The obtained porous TiO$_2$—SiO$_2$ glass body was set in an electric furnace capable of controlling the atmosphere, and after reducing the pressure to 10 Torr at room temperature, it was heated to 1,570° C. in an atmosphere of 100% He and held at this temperature for 4 hours to obtain a vitrified TiO$_2$—SiO$_2$ glass body (step (c)).

The obtained vitrified TiO$_2$—SiO$_2$ glass body was heated to 1,650° C. and formed into a block shape to obtain a formed TiO$_2$—SiO$_2$ glass body (step (d)).

The obtained glass was held at 1,400° C. for 4 hours and then quenched to control the fictive temperature (step (e)).

Figure 2:
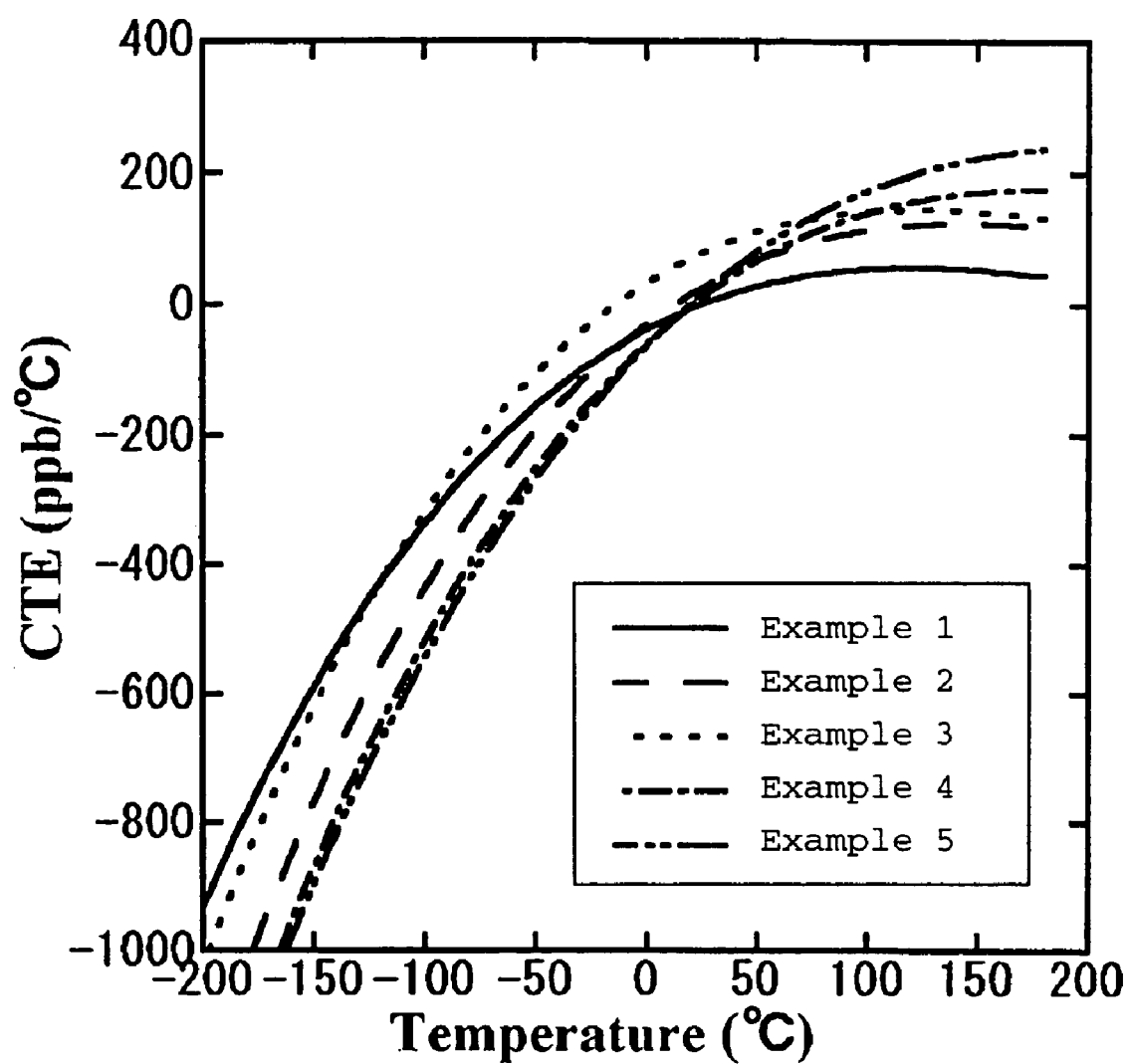
FIG. 2 is a graph showing the change by temperature of the coefficient of thermal expansion of a $TiO_2$-containing silica glass in a case where F is not contained and in a case where F is contained.

The changes by temperature of the coefficients of thermal expansion of glasses prepared in the above Examples 1 to 5 are shown in FIG. 2. The results of measurements of various physical properties are summarized in Tables 1 and 2. The evaluation methods were in accordance with the above-mentioned respective measuring methods. Further, the temperature width wherein the coefficient of thermal expansion becomes 0±5 ppb/° C. in Table 2 was obtained by determining the temperature range wherein the coefficient of thermal expansion becomes from −5 to 5 ppb/° C. from the curves in FIG. 2. Here, Examples 1 and 2 are Examples of the present invention, and Examples 3 to 5 are Comparative Examples.

TABLE 1

| | Fictive temperature (° C.) | OH group concentration (ppm) | F concentration (ppm) | Coefficient of thermal expansion from 0 to 100° C. (ppb/° C.) Minimum value to maximum value |
|---|---|---|---|---|
| Ex. 1 | 890 | 10 | 6,300 | −40 to 55 |
| Ex. 2 | 890 | 10 | 120 | −25 to 100 |
| Ex. 3 | 900 | 880 | — | 30 to 145 |
| Ex. 4 | 1,160 | 40 | — | −60 to 140 |
| Ex. 5 | 1,330 | 40 | — | −60 to 165 |

TABLE 2

| | Coefficient of thermal expansion from −50 to 150° C. (ppb/° C.) Minimum value to maximum value | Temperature width within which the coefficient of thermal expansion becomes 0 ± 150 ppb/° C. (° C.) |
|---|---|---|
| Ex. 1 | −155 to 60 | 7.6 |
| Ex. 2 | −180 to 130 | 4.6 |
| Ex. 3 | −110 to 145 | 4.2 |
| Ex. 4 | −250 to 175 | 3.8 |
| Ex. 5 | −270 to 220 | 3.5 |

In Examples 1 and 2, the fictive temperature was not higher than 1,200° C., and the F concentration was at least 100 ppm, whereby the coefficient of thermal expansion was within a range of 0±100 ppb/° C. within a temperature range of from 0 to 100° C. Further, in Example 1, the F concentration was high, whereby the coefficient of thermal expansion was such that the width of the change of the coefficient of thermal expansion was minimum in two types of temperature ranges of from 0 to 100° C. and from −50 to 150° C.

In Examples 1 and 2, the F concentration was at least 100 ppm, whereby as compared with Example 3 wherein the fictive temperature was substantially equal and no F was contained, the change by temperature of the coefficient of thermal expansion, was small within a range where the coefficient of thermal expansion was 0±5 ppb/° C. For example, when the temperature width wherein the coefficient of thermal expansion becomes 0±5 ppb/° C. is compared between Examples 1 and 3 in FIG. 2, the temperature width in Example 3 is 4.2° C., while the temperature width in Example 1 is 7.6° C. i.e. the temperature width is larger by 3.4° C., and the change by temperature of the coefficient of thermal expansion is small.

The entire disclosures of Japanese Patent Application No. 2003-100496 filed on Apr. 3, 2003, Japanese Patent Application No. 2003-321729 filed on Sep. 12, 2003 and Japanese Patent Application No. 2004-072762 filed on Mar. 15, 2004 including specifications, claims, drawings and summaries are incorporated herein by reference in their entireties.

What is claimed is:

1. A silica glass comprising TiO2, which has a fictive temperature of at most 1,000° C., a F concentration of at least 100 ppm and a coefficient of thermal expansion of 0±200 ppb/° C., from 0 to 100° C., and produced by one of the following processes:
   (a) forming a porous glass body by depositing and growing on a target quartz glass particles obtained by flame hydrolysis of glass-forming materials;

(b) holding the porous glass body in a fluorine-containing atmosphere to obtain a fluorine-containing porous glass body;
(c) heating the fluorine-containing porous glass body to a vitrification temperature to obtain a fluorine-containing vitrified glass body;
(d) heating the fluorine-containing vitrified glass body to a temperature of at least the softening temperature and forming it in a shape to obtain a fluorine-containing formed glass body; and
(e) carrying out annealing treatment wherein the formed glass body is held at a temperature exceeding 500° C., for at least 5 hours, and then, the temperature is lowered to 500° C., at an average cooling rate of at most 10° C./hr, or a step of carrying out annealing treatment wherein the formed glass body at a temperature of at least 1,200° C., is cooled to 500° C., at an average cooling rate of at most 10° C./hr, or
(a) forming a porous glass body by depositing and growing on a target quartz glass particles obtained by flame hydrolysis of glass-forming materials;
(b) holding the porous glass body in a fluorine-containing atmosphere to obtain a fluorine-containing porous glass body;
(c) holding the fluorine-containing porous glass body in an atmosphere containing oxygen at from 300 to 1,300° C., for at least 5 hours, and then heating it to a vitrification temperature to obtain a fluorine-containing vitrified glass body;
(d) heating the fluorine-containing vitrified glass body to a temperature of at least the softening temperature and forming it in a shape to obtain a fluorine-containing formed glass body; and
(e) carrying out annealing treatment wherein the formed glass body is held at a temperature exceeding 500° C., for at least 5 hours, and then, the temperature is lowered to 500° C., at an average cooling rate of at most 10° C./hr, or a step of carrying out annealing treatment wherein the formed glass body at a temperature of at least 1,200° C., is cooled to 500° C., at an average cooling rate of at most 10° C./hr.

2. The silica glass comprising $TiO_2$ according to claim 1, which has a F concentration of at least 500 ppm.

3. The silica glass comprising $TiO_2$ according to claim 1, which has a coefficient of thermal expansion of 0±150 ppb/° C., from 0 to 100° C.

4. The silica glass comprising $TiO_2$ according to claim 1, which has a F concentration of at least 1,000 ppm.

5. The silica glass comprising $TiO_2$ according to claim 1, which exhibits a fluctuation of the refractive index ($\Delta n$) of at most 2×10−4 within an area of 30 mm×30 mm in at least one plane.

6. The silica glass comprising $TiO_2$ according to claim 2, which has a coefficient of thermal expansion of 0±150 ppb/° C., from 0 to 100° C.

7. The silica glass comprising $TiO_2$ according to claim 2, which has a F concentration of at least 1,000 ppm.

8. The silica glass comprising $TiO_2$ according to claim 2, which exhibits a fluctuation of the refractive index ($\Delta n$) of at most 2×10−4 within an area of 30 mm×30 mm in at least one plane.

9. The silica glass according to claim 1, which exhibits a temperature width wherein the coefficient of thermal expansion becomes 0±5 ppb/° C., of at least 4.50° C.

10. The silica glass according to claim 9, which exhibits a temperature width wherein the coefficient of thermal expansion becomes 0±5 ppb/° C., of at least 5.0° C.

11. The silica glass according to claim 9, which exhibits a temperature width wherein the coefficient of thermal expansion becomes 0±5 ppb/° C., of at least 6.0° C.

12. An EUVL exposure device comprising the silica glass according to claim 9, wherein said glass is an optical material.

13. An EUVL exposure device comprising the silica glass according to claim 10, wherein said glass is an optical material.

14. An EUVL exposure device comprising the silica glass according to claim 11, wherein said glass is an optical material.

15. A process for producing a silica glass comprising $TiO_2$, which has a fictive temperature of at most 1000° C., a F concentration of at least 100 ppm and a coefficient of thermal expansion of 0±200 ppb/° C., from 0 to 100° C., which comprises:
(a) forming a porous glass body by depositing and growing on a target quartz glass particles obtained by flame hydrolysis of glass-forming materials;
(b) holding the porous glass body in a fluorine-containing atmosphere to obtain a fluorine-containing porous glass body;
(c) heating the fluorine-containing porous glass body to a vitrification temperature to obtain a fluorine-containing vitrified glass body;
(d) heating the fluorine-containing vitrified glass body to a temperature of at least the softening temperature and forming it in a shape to obtain a fluorine-containing formed glass body; and
(e) carrying out annealing treatment wherein the formed glass body is held at a temperature exceeding 500° C., for at least 5 hours, and then, the temperature is lowered to 500° C., at an average cooling rate of at most 10° C./hr, or a step of carrying out annealing treatment wherein the formed glass body at a temperature of at least 1,200° C., is cooled to 500° C., at an average cooling rate of at most 10° C./hr.

16. A process for producing a silica glass comprising $TiO_2$, which has a fictive temperature of at most 1000° C., a F concentration of at least 100 ppm and a coefficient of thermal expansion of 0±200 ppb/° C. from 0 to 100° C., which comprises:
(a) forming a porous glass body by depositing and growing on a target quartz glass particles obtained by flame hydrolysis of glass-forming materials;
(b) holding the porous glass body in a fluorine-containing atmosphere to obtain a fluorine-containing porous glass body;
(c) holding the fluorine-containing porous glass body in an atmosphere containing oxygen at from 300 to 1,300° C., for at least 5 hours and then heating it to a vitrification temperature to obtain a fluorine-containing vitrified glass body;
(d) heating the fluorine-containing vitrified glass body to a temperature of at least the softening temperature and forming it in a shape to obtain a fluorine-containing formed glass body; and
(e) carrying out annealing treatment wherein the formed glass body is held at a temperature exceeding 500° C., for at least 5 hours, and then, the temperature is lowered to 500° C., at an average cooling rate of at most 10° C./hr, or a step of carrying out annealing treatment wherein the formed glass body at a temperature of at least 1,200° C., is cooled to 500° C., at an average cooling rate of at most 10° C./hr.

17. A silica glass comprising TiO2, doped with halogen, and which has a fictive temperature of at most 1,000° C., and which exhibits a temperature width wherein the coefficient of thermal expansion becomes 0±5 ppb/° C., of at least 4.5° C.

18. The silica glass according to claim 17, which exhibits a temperature width wherein the coefficient of thermal expansion becomes 0±5 ppb/° C., of at least 5.0° C.

19. The silica glass according to claim 17, which exhibits a temperature width wherein the coefficient of thermal expansion becomes 0±5 ppb/° C., of at least 6.0° C.

20. An EUVL exposure device comprising the silica glass according to claim 17, wherein said glass is an optical material.

* * * * *